(12) United States Patent
Zinck

(10) Patent No.: US 7,023,103 B2
(45) Date of Patent: Apr. 4, 2006

(54) APPARATUS FOR GENERATING AN ELECTRICAL ENERGY

(76) Inventor: Clyde M. Zinck, 670 Franklin Rd., Kelowna, British Columbia (CA) V1X 3T8

( * ) Notice: Subject to any disclaimer, the term of this patent is extended or adjusted under 35 U.S.C. 154(b) by 0 days.

(21) Appl. No.: 11/119,184

(22) Filed: Apr. 29, 2005

(65) Prior Publication Data

US 2005/0242589 A1  Nov. 3, 2005

Related U.S. Application Data

(60) Provisional application No. 60/567,720, filed on May 3, 2004.

(51) Int. Cl.
*F03D 9/00* (2006.01)

(52) U.S. Cl. ............... 290/40 A; 290/40 B; 290/40 C; 290/40 D

(58) Field of Classification Search ............ 290/40 A, 290/40 B, 40 D, 40 C, 49 R, 40 E
See application file for complete search history.

(56) References Cited

U.S. PATENT DOCUMENTS 4,141,425 A * 2/1979 Treat ..................... 180/2.2
5,845,731 A * 12/1998 Buglione et al. ......... 180/65.2
6,166,449 A * 12/2000 Takaoka et al. .......... 290/40 B
6,177,735 B1 * 1/2001 Chapman et al. ............ 290/44

* cited by examiner

*Primary Examiner*—Darren Schuberg
*Assistant Examiner*—Iraj A. Mohandesi
(74) *Attorney, Agent, or Firm*—James Ray & Assoc.

(57) ABSTRACT

An apparatus for generating an electrical energy includes an electrical generator coupled to one end of a rotating shaft and a flywheel coupled to the other end of the shaft. The flywheel has a plurality of blade members disposed on an outer surface thereof. An electric fluid pump generates a flow of fluid under pressure which is directed onto the blade members causing rotation of the flywheel and subsequent rotation of the shaft. The shaft rotation is received by the electrical generator and converted into the electrical energy. A battery is provided to start pump operation and initiate rotation of the flywheel until sufficient energy is provided by the electrical generator to sustain continuous pump operation. A transformer is used to recharge the battery from the generator. A sun gear is provided to increase torque generated by the rotating flywheel. A plurality of rotating disk members are provided to store a kinetic energy generated by the rotation of the shaft and release such kinetic energy to compensate for surge in energy consumption.

18 Claims, 1 Drawing Sheet

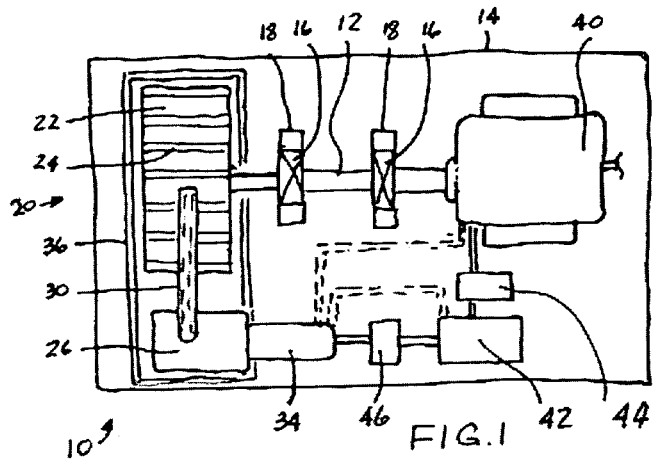
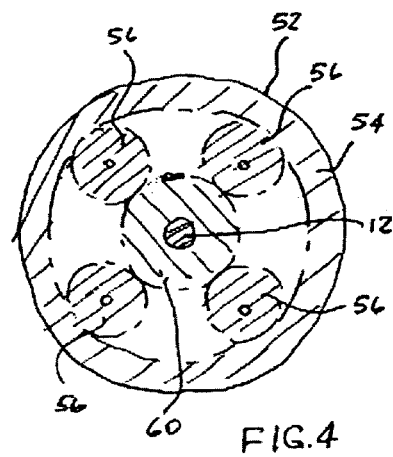
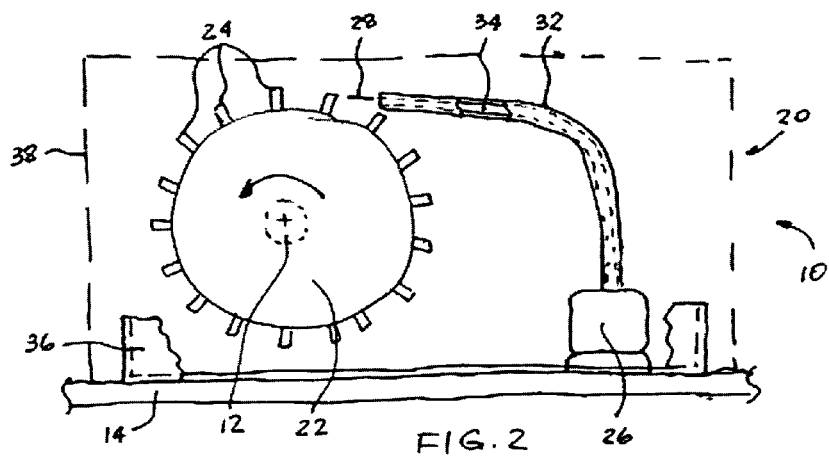
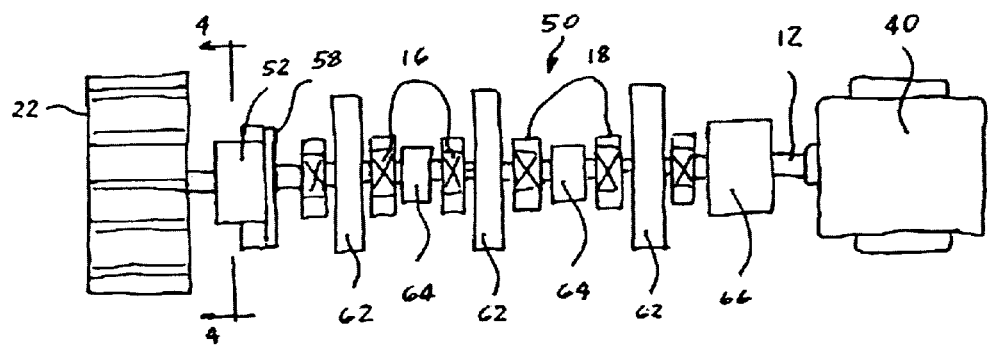

APPARATUS FOR GENERATING AN ELECTRICAL ENERGY

CROSS-REFERENCE TO RELATED APPLICATIONS

This application is related to and claims priority from U.S. Provisional Patent Application Ser. No. 60/567,720 filed on May 3, 2004.

FIELD OF THE INVENTION

The present invention relates, in general, to an apparatus for generating an electrical energy and, more particularly, this invention relates to an apparatus for generating an electrical energy which is combustion free and, yet more particularly, the instant invention relates to an apparatus for generating an electrical energy which is sufficient to power an electric vehicle.

BACKGROUND OF THE INVENTION

As is generally well known, gasoline powered internal combustion devices which are widely used in transportation, industrial and home applications place great demand on fossil fuels and produce environmentally harmful pollution.

Efforts have been made, particularly in automotive applications, to replace such internal combustion devices with alternative systems capable of generating energy to power automotive vehicles. Specifically, electric and gas-electric hybrid vehicles have been lately available in limited quantities from major automotive manufacturers.

Electric vehicles have been noted for being more environmentally friendly than conventional internal combustion engine vehicles. Electric engines are several times more efficient than internal combustion engines because they are not limited by heat differential considerations and have no significant friction creating sliding mechanisms.

Generally, available electric vehicles are powered by either electrical batteries or fuels cells. Strictly solar powered electric cars are used only for technology proven races.

The main problem with battery electric vehicles is their limited range in comparison with gasoline powered vehicles and limited life due to a low number of charge-discharge cycles provided before battery replacement is required which also is subject to environmental disposal issues. Additional problems are related to high costs associated with battery recharging and battery storage space requirements.

It is well known that a fuel cell is an electrochemical cell in which the energy of a reaction between a fuel, such as liquid hydrogen, and an oxidant, such as liquid oxygen, is converted directly and continuously into electrical energy. Electric cars operated on fuel cells require as much as four times more energy per unit distance than an electric car when hydrogen production energy is included and presently require expensive membranes manufactured from platinum and other rare metals.

Hybrid vehicles which use an electric engine and grid-rechargeable batteries for acceleration and slow speed driving, with the ability to switch to gasoline powered internal combustion for cruising, address the range problem associated with an electric vehicle and improve fuel efficiency of internal combustion engine vehicles. However, these hybrid vehicles are disadvantaged by both environmental pollution issues and high life cycle cost of electric batteries.

Therefore, there is a need for an environmentally friendly apparatus capable of generating an electrical energy which is inexpensive to operate and maintain.

SUMMARY OF THE INVENTION

The invention provides an apparatus for generating an electrical energy. Such apparatus includes an electrical generator coupled to one end of a rotating shaft and a flywheel coupled to the other end of the shaft. The flywheel has a plurality of blade members disposed on an outer surface thereof. An electric fluid pump generates a flow of fluid under pressure which is directed onto the blade members causing rotation of the flywheel and subsequent rotation of the shaft. The shaft rotation is received by the electrical generator and converted into electrical energy. The preferred fluid is a liquid. A reservoir is provided to collect the fluid discharged from the flywheel and return such fluid to the fluid pump thus providing for a recirculating operation and further providing for a substantially pollution free operation of the apparatus. An electrical battery is provided to start operation of the fluid pump and initiate rotation of the flywheel and the shaft until sufficient energy is provided by the electrical generator to sustain pump operation. A transformer is used to convert the voltage from the generator into a battery voltage thus providing for battery recharging from the generator. The electrical prime mover of the fluid pump may be configured with a dual winding to receive both generator voltage and a battery voltage or an inverter may be provided to invert battery voltage to generator voltage in which case the electrical prime mover is configured with a single winding. A sun gear is coupled to the flywheel and the shaft for multiplying torque generated by the rotating flywheel. A plurality of rotating disk members are provided to store kinetic energy generated by the rotation of the shaft and release such kinetic energy to maintain rotational velocity of the shaft and to compensate for surge in energy consumption from the generator thus balancing the overall performance of the apparatus.

OBJECTS OF THE INVENTION

It is, therefore, one of the primary objects of the present invention to provide an apparatus for generating an electrical energy.

Another object of the present invention is to provide an apparatus for generating an electrical energy which is free of internal combustion.

Yet another object of the present invention is to provide an apparatus for generating an electrical energy which is pollution free.

Yet a further object of the present invention is to provide an apparatus for generating an electrical energy which compensates for surges in energy consumption.

An additional object of the present invention is to provide an apparatus for generating an electrical energy which generates power sufficient to drive a vehicle. In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a schematic plan view of one embodiment of the present invention;

FIG. 2 is a partial schematic side elevation view of invention shown in FIG. 1;

FIG. 3 is a schematic view of another embodiment of the present invention particularly showing key torque and performance balancing elements; and FIG. 4 is a partial cross-sectional schematic view along lines 4—4 of FIG. 3, particularly showing components of the sun gear.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1–4, wherein there is shown an apparatus, generally designated 10, for generating an electrical energy. Such apparatus 10 comprises a shaft 12 which is preferably attached to a rigid structure, such as base 14, with a pair of bearing blocks 16 and bearing block supports 18 so that the shaft 12 is allowed to rotate about the base 14. The presently preferred orientation of the longitudinal axis of the shaft 12 is horizontal.

Means, generally designated 20, for rotating the shaft 12 is coupled to one end thereof and includes, in a presently preferred embodiment, a flywheel 22 having a predetermined diameter and a predetermined weight. A predetermined plurality of blade members 24 of a predetermined shape are rigidly attached to an outer surface of the flywheel 22 in a predetermined pattern. Preferably, such predetermined plurality of blade members 24 is integral to the flywheel 22. There is a fluid means 26 for generating a flow of a fluid 28 under pressure which is delivered to a predetermined portion of the flywheel 22 and directed to engage such predetermined plurality of blade members 24 through a fluid communication means 30 which is an elongated member 30 having an internal passageway 32.

Such fluid 28 may be one of liquid and gaseous and preferably, such fluid 28 is liquid. The fluid means 26 is therefore a well known fluid pump 26 capable of generating a flow of fluid 28 having one each of a predetermined pressure and a predetermined velocity. The fluid pump 26 is connected to an electric prime mover 34 and operable thereby to generate the fluid flow and fluid pressure.

A reservoir 36 is provided to collect the fluid 28 discharged from the flywheel 22 and return such fluid 28 to the fluid pump 26 thus recirculating the fluid 28. It will be appreciated that recirculation of the fluid 28, provides for a substantially pollution free operation of the apparatus 10 of the present invention.

Preferably, the flywheel 22, the fluid pump 26 and the reservoir 36 are contained within a housing 38 attached to the base 14.

A generator means 40 is coupled to a distal end of the shaft 12 for generating an electrical energy having each of a predetermined electrical voltage and a predetermined horsepower upon rotation of the shaft 12. The generator means 40 further has a first electrical power output connected to at least one device (not shown) for using the generated electrical energy.

The first predetermined voltage generated by the electrical generator means 40 may be one of any well known voltages, including but not limited to 110 volts, 220 volts, 440 volts and any combination thereof used in a variety of household and industrial applications.

It will be appreciated that, in operation, flow of fluid pressure onto the predetermined plurality of blade members 24 will generate a rotation of the flywheel 22 and subsequently generate a rotation of the shaft 12 wherein the rotational velocity of the shaft 12 will be greater than the rotational velocity of the outer surface of the flywheel 22. The rotation of the flywheel 22 will also generate a predetermined torque applied to the shaft 12 wherein such predetermined torque will be defined by the predetermined weight and rotational velocity of the flywheel 22. The rotation of the shaft 12 will be received by a preselected portion of the electrical generator means 40, such as a magnet (not shown), enabling generation of the electrical energy by converting a mechanical energy of the rotating shaft 12.

Preferably, the electrical generator means 40 has a second electrical power output connected to the electric prime mover 34 providing electrical energy sufficient to operate such electric prime mover 34. It will be appreciated that such second connection enables self-regenerative operation of the apparatus 10.

To initiate rotation of the flywheel 22 and the shaft 12 from a complete stop condition, the apparatus 12 is adapted with an electrical storage means 42, such as an electrical battery, capable of providing an electrical energy having a second predetermined voltage and having an electrical connection with the electrical prime mover 34 which, in this embodiment, is adapted with a second winding means (not shown) to receive such second predetermined voltage. The use of the electrical storage means 42 to generate rotation of the flywheel 22 and the shaft 12 will continue until the electrical generator means 40 will provide the second predetermined voltage.

The apparatus 10 may also be provided with a means 44 for recharging such electrical storage means 42 which, in the presently preferred embodiment, is a transformer means 44 electrically connected intermediate the electrical generator means 40 and the electrical storage means 42 and converting the first predetermined voltage generated by the electrical generator means 40 into the second predetermined voltage received by the electrical storage means 42 enabling recharging thereof during rotation of the shaft 12.

It has been found by experimentation that the apparatus 10 of the present invention according to the afore described embodiment is sufficient to generate electrical energy under a steady-state electrical energy draw from at least one device (not shown) connected thereto.

It has also been found that when such electrical energy draw is surged stressing the performance of the apparatus 10 and slowing the rotational velocity of the magnet (not shown) of the electrical generator means 40, the apparatus 10 may be provided with means, generally designated 50 and best shown in FIG. 3, for generating a second predetermined torque applied to a predetermined portion of the shaft 12, preferably adjacent the electrical generator means 40, wherein such second predetermined torque is greater than the first predetermined torque generated by the flywheel 22.

Such means 50 includes a first gear means 52 disposed adjacent the flywheel 22 and having a first predetermined portion thereof connected to a rigid structure, a second predetermined portion thereof connected to the flywheel 22 and a third predetermined portion thereof coupled to the shaft 12 for rotation therewith. Preferably, such first gear means 52 is a well known planetary gear set 52, best shown in FIG. 4, having a ring 54 coupled to the flywheel 22, a plurality of planet gears 56 connected to a carrier 58 which is rigidly attached to the base 14 and a sun gear 60 coupled to the shaft 12.

Such planetary gear set 52 increases the torque generated by rotation of the flywheel 22 and delivers such increased torque to the shaft 12.

The means 50 may further include at least one disk member 62 having a predetermined weight which is rigidly attached to a predetermined portion of the shaft 12 for rotation therewith. Such at least one disk member 62 is for storing a kinetic energy generated by the rotation of the shaft 12 and for releasing such kinetic energy during electrical draw surges applied to the electrical generator means 40. Such release of the stored kinetic energy maintains rotational velocity of the shaft 12 and provides a required torque for maintaining rotation of the magnet (not shown) and for balancing the performance of the apparatus 10.

Preferably, there are a plurality of disk members 62 axially aligned and connected therebetween with a second gear means 64 which is a second planetary gear set 64. Advantageously, such second planetary gear set 64 alternate rotational directions of such plurality of disk members 62 and balance directional distribution of the torque applied to the shaft 12. The shaft 12 in such embodiment will be formed by a plurality of shaft portions, each axially aligned and supported by the pair of bearing blocks 16 and bearing block supports 18, as best shown in FIG. 3.

Additionally, in applications wherein the rotational velocity of the shaft 12 generated by the disk member 62 disposed adjacent the electrical generator means 40 exceeds the rotational speed required thereby, the apparatus 10 is adapted with a third gear set 66 capable of reducing the rotational velocity of the shaft 12.

Alternatively, the rotational velocity of the shaft 12 required by the electrical generator means 40 may be provided by regulating the rotational velocity of the flywheel 22 which in turn is regulated by fluid pressure and velocity generated by the fluid means 28.

At least fluid means 26, prime mover 34, electrical generator means 40 and electrical storage means 42 have an electrical connection with a control means (not shown) provided for controlling operation of the apparatus 10.

Although the present invention has been shown in terms of the flywheel 22 and the fluid means 26 generating the rotation of the shaft 12, it will be apparent to those skilled in the art, that the present invention may be applied to other forms of generating such rotation of the shaft 12. For example, a power transmission means such as belt, gear, chain and the like coupled to the shaft 12 will generate rotation thereof in combination with an independent prime mover. Such prime mover may be electrically driven by the electrical generator means 40 or may be pneumatically or hydraulically driven by a corresponding drive means. Alternatively, a rotary drive means may be directly coupled to the end of the shaft 12.

The means for initiating rotation of the flywheel 22 may include an independent prime mover engageable directly with a predetermined portion of such flywheel 22.

Furthermore, the means for recharging the electrical storage means 42 may include a second electrical generator means, such as an alternator, coupled to the shaft 12 with any well known power transmission means, such as belt, chain and the like, and having an electrical connection with the electrical storage means 42. In operation, the rotation of the shaft 12 will enable the second electrical generator means to generate the second predetermined voltage and recharge the electrical storage means 42.

The electrical storage means 42, such as an electrical battery, may be a well known twelve-volt electrical battery currently found, in combination with the alternator, on any vehicle (not shown) having ground engaging wheels.

Additionally, an inverter 46 may be connected intermediate the prime mover 34 and the electrical storage means 42 for converting the second predetermined voltage generated by the electrical storage means 42 to a first predetermined voltage generated by the electrical generator means 40, thus providing for a simplified construction of the prime mover 34.

It will be further apparent to those skilled in the art that the apparatus 10 according to the embodiments of the present invention may be utilized for powering the electric vehicle wherein the electrical generator means 40 will be connected with various devices within such vehicle which are operable by the electrical energy.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus for generating an electrical energy, said apparatus comprising:
   (a) a rotary shaft;
   (b) means coupled to one end of said shaft for rotating it at a predetermined rotational velocity and for applying a predetermined torque to said shaft, said shaft rotational means including,
      (i) a flywheel having a predetermined plurality of blade members rigidly attached to an outer surface of said flywheel in a predetermined pattern,
      (ii) a means for generating a flow of a fluid having a predetermined pressure and a predetermined velocity, and
      (iii) means connectable with said fluid means for delivering said flow of said fluid to said flywheel and directing said flow to a predetermined portion of said predetermined plurality of blade members causing a rotation of said flywheel and said shaft; and
   (c) a generator means coupled to an axially opposed end of said shaft and for generating an electrical energy having a predetermined electrical voltage and a predetermined horsepower upon rotation of said shaft, said generator means having at least one electrical power output connected to at least one device for using said generated electrical energy having said predetermined electrical voltage and said predetermined horsepower.

2. The apparatus, according to claim 1, wherein said fluid is one of liquid and gaseous.

3. The apparatus, according to claim 2, wherein said fluid is said liquid.

4. The apparatus, according to claim 3, wherein said rotational means further includes a fluid reservoir disposed adjacent said flywheel and engageable with said fluid means for collecting said fluid delivered to said flywheel and discharged therefrom during rotation thereof and for returning said fluid to said fluid means.

5. The apparatus, according to claim 4, wherein said apparatus further includes a housing encasing at least said reservoir, said flywheel and said fluid means.

6. The apparatus, according to claim 1, wherein said apparatus further includes means engageable with one of said flywheel and said fluid means for initiating said rotation of said shaft.

7. The apparatus, according to claim 6, wherein said rotation initiation means is an electric prime mover coupled to said fluid means and having an electrical connection with said generator means, said electric prime mover adapted to receive said predetermined voltage to be operable thereby.

8. The apparatus, according to claim 7, wherein said rotation initiating means further includes an electrical energy storage means having an electrical connection with said electric prime mover, said electrical energy storage means providing an electrical energy having a second predetermined voltage, wherein said electric prime mover is adapted to receive said second predetermined voltage to be operable thereby.

9. The apparatus, according to claim 8, wherein said apparatus further includes means having a first electrical connection with said electrical energy storage means and having a second electrical connection with said generator means for transforming said first predetermined voltage into said second predetermined voltage for recharging said electrical energy storage means during rotation of said shaft.

10. The apparatus, according to claim 8, wherein said apparatus further includes a second generator means having an electrical connection with said electrical energy storage means and having a mechanical connection with a predetermined portion of said shaft, whereby a rotation of said shaft enables said second generator means to generate said electrical energy having said second predetermined voltage.

11. The apparatus, according to claim 1, wherein said apparatus further includes a gear means disposed adjacent said flywheel and having a first predetermined portion thereof connected to a rigid structure, a second predetermined portion thereof connected to said rotational means and a third predetermined portion thereof coupled to said shaft for rotation therewith.

12. The apparatus, according to claim 11, wherein said gear means is a sun gear.

13. The apparatus, according to claim 1, wherein said apparatus further includes means rigidly attached to a predetermined portion of said shaft intermediate said rotational means and said generator means for storing a kinetic energy generated by a rotation of said shaft and for releasing said kinetic energy during an electrical draw surge applied to said generator means from said at least one device connected thereto.

14. The apparatus, according to claim 13, wherein said kinetic energy means includes a predetermined plurality of disk members, each having a predetermined weight.

15. The apparatus, according to claim 13, wherein each pair of said predetermined plurality of said disk members includes a second gear means disposed therebetween, said second gear means reversing a rotational direction of one disk member disposed within said each pair.

16. The apparatus, according to claim 15, wherein said second gear means is a second sun gear.

17. The, apparatus, according to claim 13, wherein said apparatus includes a third gear means axially disposed intermediate said kinetic energy means and said generator means for reducing a rotational velocity of said shaft.

18. The apparatus, according to claim 1, wherein said apparatus further includes a control means.

* * * * *